(12) United States Patent
Vogt et al.

(10) Patent No.: US 8,704,122 B2
(45) Date of Patent: Apr. 22, 2014

(54) CONNECTING PIECE, MULTI-AXIS MACHINING CENTER, ELASTICITY CONTROL METHOD

(75) Inventors: Christian Vogt, Dietmannsried (DE); Waldemar Kargus, Pfronten (DE); Martin Reisacher, Kempten (DE)

(73) Assignee: Sauer GmbH LASERTEC, Pfronten (*) Notice: Subject to any disclaimer, the term of this patent is extended or adjusted under 35 U.S.C. 154(b) by 489 days.

(21) Appl. No.: 12/742,134

(22) PCT Filed: Nov. 10, 2008

(86) PCT No.: PCT/EP2008/009464
§ 371 (c)(1),
(2), (4) Date: Sep. 20, 2010

(87) PCT Pub. No.: WO2009/062647
PCT Pub. Date: May 22, 2009

(65) Prior Publication Data
US 2011/0000899 A1      Jan. 6, 2011

(30) Foreign Application Priority Data

Nov. 12, 2007    (DE) ................ 10 2007 053 737

(51) Int. Cl.
*B23Q 1/26* (2006.01)
*B23K 26/00* (2006.01)
*B23K 26/42* (2006.01)

(52) U.S. Cl.
USPC .................. 219/121.6; 83/698.31

(58) Field of Classification Search
USPC .......... 219/121.6–121.86; 83/698.11, 698.31; 409/218
See application file for complete search history.

(56) References Cited

U.S. PATENT DOCUMENTS

| 4,673,329 A | 6/1987 | Kato |
| 6,633,018 B2 * | 10/2003 | Shikoda et al. .......... 219/121.63 |
| 6,797,917 B1 | 9/2004 | Yamaoku et al. |
| 2006/0153668 A1 | 7/2006 | Weick et al. |

FOREIGN PATENT DOCUMENTS

| DE | 43 26 254 A1 | 2/1995 |
| EP | 0 421 117 A | 4/1991 |
| GB | 2 071 609 A | 9/1981 |
| JP | 2875855 B2 * | 3/1999 |
| WO | 2007/036797 A1 | 4/2007 |

OTHER PUBLICATIONS

"Controlled/Buffered Downpressure Tool Holder," IBM Technical Disclosure Bulletin, IBM Corp. New York, US. vol. 34, No. 2, Jul. 1, 1991, pp. 96-97.
Patent Abstracts of Japan, Bd. 2000, Nr. 12, Jan. 3, 2001; JP 2000 237874 A (Amada Co Ltd), Sep. 5, 2000.
Patent Abstracts of Japan, Bd. 017, Nr. 212 (M-1402), Apr. 26, 1993; JP 04 351273 A (Amada Metrecs Co Ltd), Dec. 7, 1992.

* cited by examiner

*Primary Examiner* — Samuel M Heinrich
(74) *Attorney, Agent, or Firm* — Ziegler IP Law Group, LLC.

(57) ABSTRACT

A connecting piece for a tool of a multi-axis machining center has a support on the machining center side, a holder at the tool side and a pushing device which elastically pushes the holder into a defined position against the support. The pushing force of the pushing device can be varied during the operation of the machining center.

15 Claims, 2 Drawing Sheets

CONNECTING PIECE, MULTI-AXIS MACHINING CENTER, ELASTICITY CONTROL METHOD

CROSS-REFERENCE TO RELATED APPLICATIONS

This application is the U.S. National Stage of International Application No. PCT/EP2008/009464, filed on 10 Nov. 2008, which designated the United States of America and which was published under PCT Article 21 (2) as Publication No. WO2009/062647 A1 and which claims priority to and the benefit of German Application No. 10 2007 053 737.0, filed 12 Nov. 2007, the disclosures of which are incorporated herein by reference in their entireties.

BACKGROUND

1. Field

The aspects of the disclosed embodiments relate to a connecting piece, a multi-axis machining center comprising a connecting piece, and an elasticity control method.

2. Brief Description of Related Developments

Connecting pieces are used in order to have elasticity in the system in the case of collisions between the tool of the machine and other machine parts or the workpiece, so that damages due to rigid components are avoided. In this context "elasticity" does not necessarily mean a linear elasticity similar to a spring constant. Rather, a general flexibility under defined conditions is to be meant.

A known connecting piece comprises a support on the machining center side, a holder on the tool side and a clamping device which elastically pushes the holder into a defined position against the support. The clamping device comprises a plurality of pressure springs and tension springs, the tension of which can be adjusted by manually setting the spring preloads.

What is disadvantageous with regard to the known connecting pieces is that the system elasticity provided by them can only laboriously and, in operation, virtually not be changed. E.g., tool heads can have different weights, so that they show different inertial forces at the same acceleration. This also makes necessary different mounting forces, what can only be achieved by manual intervention. It can also be desirable to adjust the mounting force in dependence on the working mode. E.g., when a machining center is programmed, collisions are more likely to occur than during the subsequent operation, so that for the programming a lower system rigidity can be desired than is during the subsequent working. It can also be desirable to adjust the rigidity in dependence on the adjusting speed or the acceleration of a working head or tool. The position of the tool can also cause different torques and forces and, accordingly, different conditions with regard to the reaction of the connecting piece.

SUMMARY

The aspects of the disclosed embodiments provide a connecting piece, a multi-axis machining center comprising a connecting piece, and an elasticity control method, which allow a quick and automated adaptation of the elasticity in the connecting piece.

These aspects are disclosed in accordance with the features of the independent claims. Dependent claims are directed on preferred embodiments.

A connecting piece for a tool of a multi-axis machining center has a support on the machine side, a holder (12) on the tool side and a pushing device (10) which elastically pushes the holder into a defined position against the support. The pushing force of the pushing device can be varied during the operation of the machining center.

The pushing device can comprise a pneumatic and/or hydraulic and/or spring-elastic and/or electromagnetic means. Preferably, it is of the pneumatic type.

The pushing device can be provided in addition to a conventional clamping device, which elastically pushes the holder into the defined position against the support with a preset force.

BRIEF DESCRIPTION OF THE DRAWINGS

In the following individual aspects of the disclosed embodiments are described with reference to the drawings.

DETAILED DESCRIPTION OF THE DISCLOSED EMBODIMENTS

Figure 1:
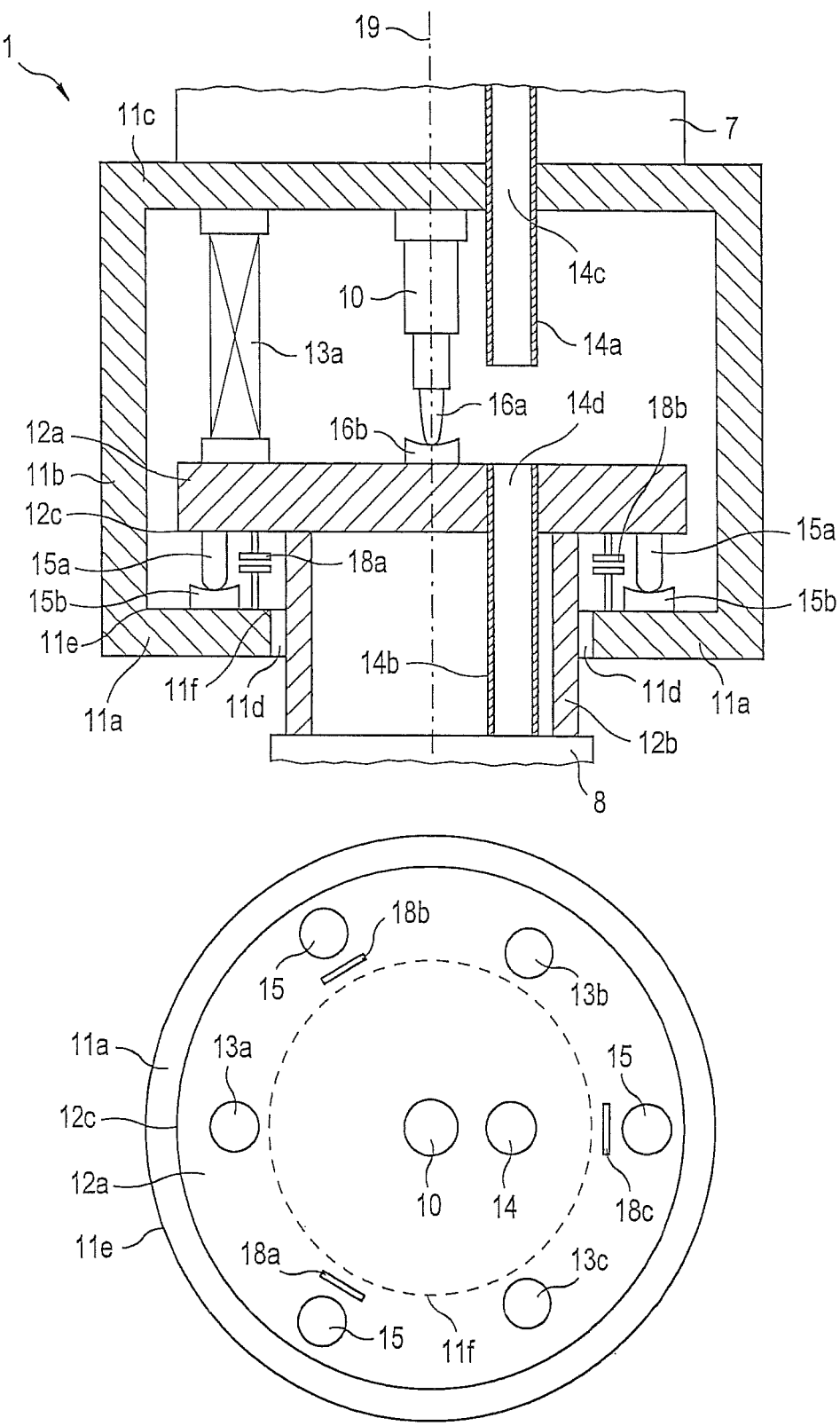
FIG. 1 shows a connecting piece in section and in a schematic plan view.

In the Figures same reference numerals mean same components. The features are to be combinable with each other and are to be regarded as combinable even if this is not expressly said, as far as a combination of the features is not excluded for technical reasons.

In the Figures, 1 means a connecting piece, 2 a machining center, 3 a tool, e.g. a laser head, 4 a workpiece table, 5 a machine frame, 6, 7 and 8 are actuators for the translational and rotatory relative adjustment of workpiece and tool head with respect to each other, 9 means the workpiece, 10 a pushing device, 11 a machine-side support, 12 a tool-side holder, 13 a clamping device, 14 a laser beam passage, 15 a positioning means, 16 a force transmission area, 18 a disengagement sensor, and 19 an axis.

FIG. 1 schematically shows, at the top thereof, the section of a side view of the connecting piece 1 and, at the bottom thereof, schematically shows a plan view of the arrangement of relevant components. The support 11 on the machining center side can have a machine-side plate 11c which can be attached to machine-side (frame-side) components of the machining center, e.g. a frame or an actuator 7. Opposite to the support plate 11c there can be a support area 11a which can be designed as a plate having a central hole 11d. The components 11a and 11c can be connected with each other via connecting regions 11b. The machine-side support 11 can be designed as a closed housing (except for the opening 11d). A tool-side holder 12 can have a holder plate 12a and a connecting pipe 12b connected therewith. The connecting pipe 12b can penetrate the opening 11d of the support area 11a. The holder plate 12a can be designed to be larger than the opening 11d. At the free end of the pipe 12b tool-head-side components can be fixed, e.g. one or more actuators 8.

The support 11 and the holder 12 are not fixedly connected to each other, but elastically. A positioning means 15 can make sure that in the case of a pressure acting in one direction (e.g. downwards in FIG. 1) the machine-side support 11 and the tool-side holder 12 reach a defined position relative to each other. A plurality of positioning means 15 can be provided and can, in certain areas, have positive-locking individual parts, e.g. a convex portion 15a on the holder side and a correspondingly concave portion 15b on the support side. There can be provided two such positioning means 15. A third positioning means can be provided to ensure a three-point support. The positioning means 15 can be distributed around the opening 11*d*, e.g. evenly every 120°.

10 designates a pushing device which elastically pushes the holder 12 into a defined position against the support 11. The pushing force of the pushing device can be varied during the operation of the machining center. It can be varied automatically without a manual intervention of an operator being necessary for this purpose. The variation can be effected relatively quickly, e.g. within a time period of less than one second, preferably less than 0.5 seconds.

The pushing device 10 can be a pneumatic pushing device and/or a hydraulic and/or a spring-elastic and/or an electromagnetic pushing device. Preferably, it is of the pneumatic type, e.g. a pneumatically operated cylinder which, under gas pressure, pushes the holder 12 against the support 11. By adjusting the gas pressure the pushing force can be set automatically. Due to the compressibility 30 of the gas, the elasticity of the pushing device 10 and, thus, of the connecting piece 1 is guaranteed. However, there can also be provided an electromagnetic means which generates a pushing force in the desired way by means of an electromagnet. Electromagnets, too, are not rigid, so that in the case of collisions the electromagnetically generated force can possibly be overcome, so that a system elasticity is given.

The connection between pushing device 10 and tool-side 10 holder 12 and/or machine-side support 11 does not have to be fixed/rigid, but can also only be force-locked in one direction. Here, too, in a certain way positive-locking force transmission areas 16*a, b* similar to the components 15 can be provided.

In operation, the pushing device 10 pushes the holder 12 against the support 11 into the defined position. Then, the tool, too, which is indirectly or directly fixed to the holder 12, has the position assumed in the control system. The pushing force can be adjusted in such a way that the forces usually occurring during operation (inertial forces, reaction forces, weight forces, torques, . . . ) can be absorbed and, in particular, do not lead to a disengagement of the holder 12 from the defined position relative to the support 11. However, the pushing force of the pushing device 10 is adjustable. It can be adjusted in such a way that the respectively exerted pushing force generates a defined and possibly approximately constant excess force before the holder is disengaged from the defined position. As shown in FIG. 1, the pushing device 10 between the support plate 11*c* and the holder plate 12*a* can have a pushing effect in such a way that, consequentially, the holder plate is pushed away from the machine frame towards the tool and to the support 5 area 11*a*. A disengagement from the defined position, e.g. in the case of a collision, is consequentially effected by a movement of the holder plate 12*a* towards the machine frame.

In addition to the pushing device 10 one or more conventional clamping devices 13 can be provided. These can be pressure springs which functionally—just as the pushing device 10—push the holder into a defined position relative to the support. These conventional clamping devices are, however, not adjustable regarding their force during operation or automatically without manual intervention. They can, however, be adjusted altogether in such a way that they generate a minimum pushing force which is desired in any case. Moreover the pushing device 10 can generate a variable part which is generated in dependence on particular parameters.

The tool can be a laser head. Accordingly, the connecting piece 1 can have a laser beam passage 14. Finally, this passage can be aligned openings 14*c*, 14*d* and/or pipe sections 14*a*, 14*b*, which allow the passage of a laser beam through the connecting piece 1, in particular through parts of the support 11 and/or of the holder 12. An optical wave guide can be provided, but not necessarily has to.

The schematic plan view in FIG. 1, bottom part, shows the arrangement of the individual components in a particular embodiment. The outer circle 11*e* designates the outer limitation of the support area 11*a*. 11*f* is the edge of the opening 11*d*. 12*c* is the outer edge of the plate 12*a*. The positioning means 15 can be located between the edge 12*c* of the plate 12*a* and the edge 11*f* of the hole 11*d*. Three thereof can be provided, preferably evenly spaced over the circumference of the circle. They can be, but do not need to be of identical structure. They can be designed in such a way that they lead to a defined position when the pushing force is exerted to a sufficient extent, without leading to overdeterminations in the definition of the position.

There can also be provided several ones of the conventional clamping devices 13. E.g., three thereof can be provided which can also be evenly distributed over the circumference of the circle. The pushing device 10 can be located in the center and as a single member. 14 schematically designates the passage for the laser beam. It can lead into an opening of the pipe 12*b*.

In contrast to what is shown, the pushing device 10 can consist of a plurality of individual pushing means, e.g. of a plurality of hydraulic or pneumatic or electromagnetic units which can also be distributed evenly. The conventional clamping device 13 can—in contrast to what is shown—also be provided as a single member and, possibly, be arranged symmetrically centrically relative to the axis 19.

The other way round than is schematically shown the tool-side holder 12 can be designed as a more or less closed housing and the machine-side support 11 as a component protruding from the housing. The support 11 as well as the holder 12 can be designed as comparatively open structures.

Figure 2:
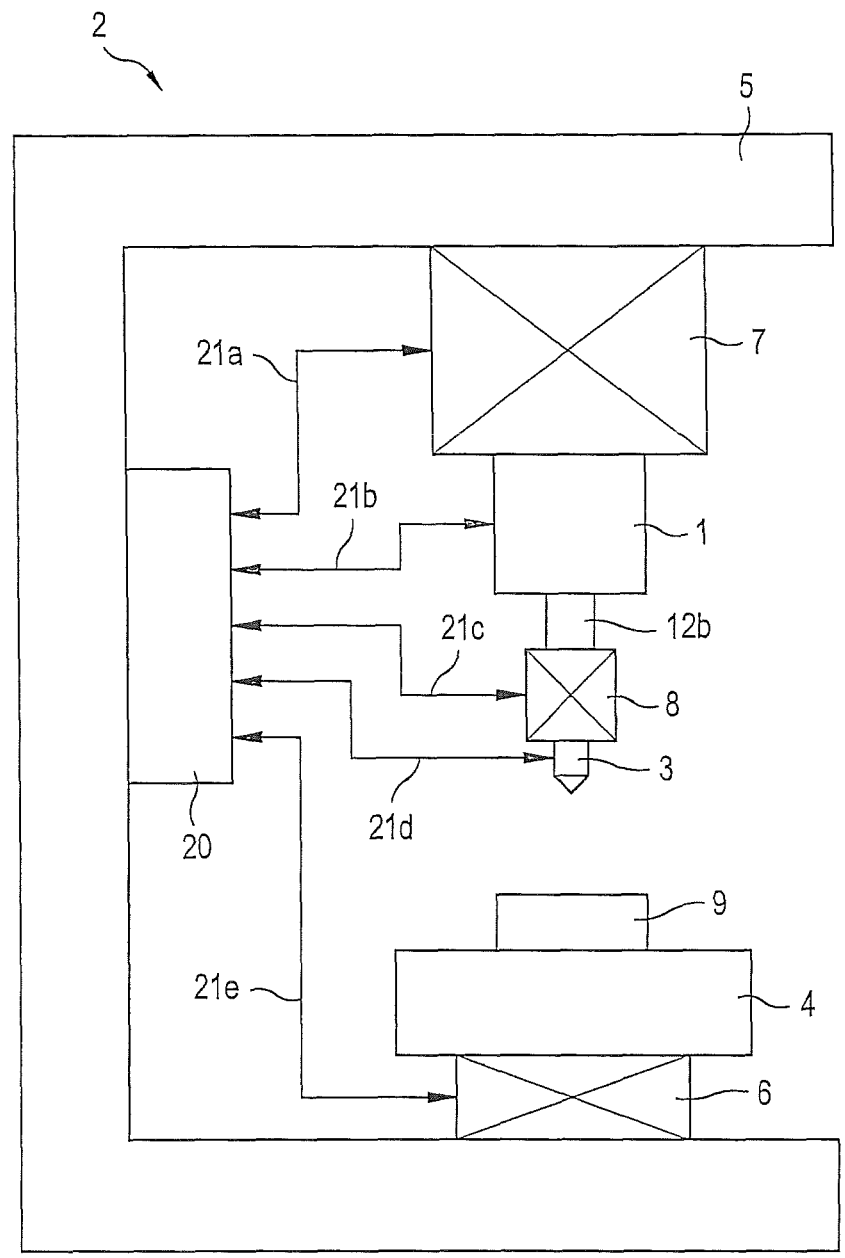
FIG. 2 shows a multi-axis machining center comprising a connecting piece.
Figure 2:
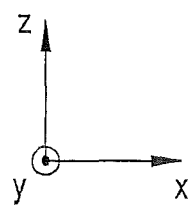

FIG. 2 schematically shows a multi-axis machining center 2. It allows the relative adjustment of the tool 3 and the workpiece 9 which are adjustable relative to each other along or around a plurality of axes. In particular three translational and two rotatory axes are provided.

The adjustability can be achieved by actuators 6, which are located between the workpiece table 4 and the machine frame 5, and/or by actuators 7 between the machine frame 5 and the connecting piece 1 and/or by actuators 8 between the connecting piece 1 and the tool 3. In particular, the configuration can be such that one or two rotatory actuators are provided between the connecting piece 1 and the tool 3, whereas the remaining actuators are provided on the other side of the connecting piece 1.

A control system 20 is provided which controls the most various machine functions, and in this way particularly the pushing force of the pushing device 10. The control system can be of the pneumatic type, which controls the gas pressure in a gas cylinder, or it can be an electromagnetic control system which controls the current flow by means of an electromagnet. The control system 20 can receive various sensor signals. It can control the pushing device in accordance with sensor signals and/or in accordance with internally known parameters (e.g., position of the workpiece, position of the tool, speed or acceleration of the tool by the actuators, working mode). In this way, the control system 20 can quickly adjust the pushing force in the connecting piece 1 in dependence on the respectively considered and desired parameters.

In the connecting piece 1 one or more disengagement sensors 18 can be provided which detect the disengagement of the holder and the support from the defined relative position to each other. There can be provided, e.g., three disengagement sensors 18*a-c* preferably evenly distributed over the circumference of the holder plate. They can generate a qualitative or also a quantitative measure on the amount of the disengagement. They can, e.g., be of a capacitive type and can generate an electrically evaluable quantity through the change of the distance of two plates serving as capacitors. Then, the control system can, e.g., control the pushing force of the pushing device 10 also in accordance with these disengagement sensors 18, e.g., in particular, in such a way that the pushing force becomes minimal (zero) if a disengagement is detected. An emergency switch-off of the machining center can also be effected in accordance with the signals from the disengagement sensors. The disengagement sensor 18 can be provided in the connecting piece 1. It can, however, also be designed as a collision detector being provided at a suitable place of the machining center 5.

The connecting piece 1 comprises the necessary terminals (not shown), in particular, according to requirements, terminals for electrical signals or electrical power, the pneumatic system, the hydraulic system, or the like. The machine can have appropriate pneumatic sources or hydraulic sources (pumps), depending on the pushing device 10.

The pushing force of the pushing device 10 in the connecting piece 1 can be part of the programming and be predefined. However, on the other hand, it can be calculated ad hoc from the parameters which have to be considered respectively (weight of the tool, tool position, speed, acceleration, operation phase, operation mode, . . . ). For the calculation, suitable algorithms can be predetermined or input, on the basis of which the respective pushing force is calculated. In addition to considerations regarding statics, also dynamic effects can be taken into account. The operation mode can also be such that, during programming, the respective pushing forces are calculated by an algorithm and, then, are stored as part of the program.

What is claimed is:

1. A connecting piece for a tool of a multi-axis machining center, comprising:
   a support on a machining center side,
   a holder at a tool side, and a pushing device which elastically pushes the holder into a defined position against the support,
   wherein a pushing force of the pushing device is variable during operation of the machining center.

2. The connecting piece according to claim 1, further comprising a clamping device configured to elastically push the holder into a defined position against the support by a pre-set force.

3. The connecting piece according to claim 1, wherein the pushing device is a pneumatic or a hydraulic or a spring-elastic or an electromagnetic means.

4. The connecting piece according to claim 1, wherein the pushing device pushes the holder in the direction of an axis of the holder towards the support.

5. The connecting piece according to claim 4, wherein the pushing device is attached at the center of the holder.

6. The connecting piece according to claim 1 further comprising a passage for a laser beam.

7. The connecting piece according to claim 1 further comprising a positioning device for a defined positioning of the holder and the support relative to each other.

8. The connecting piece according to claim 1 further comprising a terminal through which the connecting piece can be provided with control signals or with a medium for the pushing device.

9. The connecting piece according to claim 7 further comprising at least one disengagement sensor which detects a disengagement of the holder and the support from the defined relative position to each other.

10. A multi-axis machining center comprising:
    a machine frame including a support,
    a tool adjustable relative to the machine frame or around a plurality of axes,
    actuators for effecting an adjustment along or around the axes,
    a control system for controlling the actuators,
    a connecting piece including a pushing device elastically pushing the tool into a defined position against the support, the pushing device producing a pushing force which is variable during operation of the machining center, and
    a control system for the pushing device of the connecting piece.

11. The machining center according to claim 10, wherein the control is designed for adjusting the pushing force in accordance with one or more of the following parameters:
    working mode of the machine,
    working step of the machine,
    adjustment of speed,
    acceleration of the tool,
    position of the tool.

12. The machining center according to claim 10, further comprising a laser processing head.

13. A method for controlling the elasticity of the connection of a tool with a multi-axis machining center, comprising:
    providing a connecting piece wherein a support on the machining center side is automatically adjustably pushed against a holder on the tool side by an adjustable pushing device,
    determining a pushing force for the pushing device in accordance with one or more machine parameters or operational parameters of the multi-axis machining center, and
    adjusting the determined pushing force in the connecting piece.

14. The method according to claim 13, wherein the pushing force is determined beforehand and is stored as part of a machining program.

15. The method according to claim 13, wherein the pushing force is determined during the operation of the machining center.

* * * * *

UNITED STATES PATENT AND TRADEMARK OFFICE
CERTIFICATE OF CORRECTION

PATENT NO. : 8,704,122 B2  Page 1 of 1
APPLICATION NO. : 12/742134
DATED : April 22, 2014
INVENTOR(S) : Vogt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 620 days.

Signed and Sealed this

Twenty-ninth Day of September, 2015

Michelle K. Lee
*Director of the United States Patent and Trademark Office*